(12) United States Patent
Hirata et al.

(10) Patent No.: US 10,010,828 B2
(45) Date of Patent: Jul. 3, 2018

(54) $CO_2$ RECOVERY DEVICE AND METHOD FOR CLEANING FILTRATION MEMBRANE DEVICE OF $CO_2$ RECOVERY DEVICE (71) Applicant: MITSUBISHI HEAVY INDUSTRIES, LTD., Tokyo (JP)

(72) Inventors: Takuya Hirata, Tokyo (JP); Hiromitsu Nagayasu, Tokyo (JP); Hiroshi Tanaka, Tokyo (JP); Tomoki Noborisato, Tokyo (JP); Tsuyoshi Oishi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 255 days.

(21) Appl. No.: 14/893,342

(22) PCT Filed: Feb. 2, 2015

(86) PCT No.: PCT/JP2015/052888
§ 371 (c)(1),
(2) Date: Nov. 23, 2015

(87) PCT Pub. No.: WO2015/119083
PCT Pub. Date: Aug. 13, 2015

(65) Prior Publication Data
US 2016/0121260 A1 May 5, 2016

(30) Foreign Application Priority Data

Feb. 5, 2014 (JP) .................................. 2014-020789

(51) Int. Cl.
*B01D 53/14* (2006.01)
*B01D 65/02* (2006.01)
*B01D 61/14* (2006.01)

(52) U.S. Cl.
CPC ..... *B01D 53/1425* (2013.01); *B01D 53/1412* (2013.01); *B01D 53/1475* (2013.01);
(Continued)

(58) Field of Classification Search
CPC ........ B01D 2252/103; B01D 2252/204; B01D 2257/504; B01D 2258/0283;
(Continued)

(56) References Cited

U.S. PATENT DOCUMENTS 4,180,548 A   12/1979   Say et al.
4,341,746 A   7/1982   Sarsten et al.
(Continued)

FOREIGN PATENT DOCUMENTS

EP   0 013 151 A1   7/1980
EP   1 967 250 A1   9/2008
(Continued)

OTHER PUBLICATIONS

Extended (Supplementary) European Search Report dated Mar. 21, 2016, issued in counterpart European Application No. 15746026.2 (7 pages).
International Search Report dated Apr. 21, 2015, issued in counterpart application No. PCT/JP2015/052888 (2 pages).
Written Opinion dated Apr. 21, 2015, issued in counterpart application No. PCT/JP2015/052888 (4 pages).
(Continued)

*Primary Examiner* — Cabrena Holecek
(74) *Attorney, Agent, or Firm* — Westerman, Hattori, Daniels & Adrian, LLP (57) ABSTRACT

A filtration membrane device which uses a filter to collect solid contents remaining in a branched lean solution cleans the filter by using a low-concentration $CO_2$ absorption liquid circulating within the system as cleaning water (containing the absorption liquid); rough cleaning, which returns the
(Continued)

low-concentration $CO_2$ absorption liquid used for cleaning to a lean solution supply line, is performed; the filter is finish-cleaned by cleaning water from outside the system which does not include the $CO_2$ absorption liquid; the $CO_2$ absorption liquid which is adhered to the solid contents is washed and removed; finish-cleaning water which includes the $CO_2$ absorption liquid is returned to the lean solution supply line the moisture content within the system is maintained at a prescribed value by adjusting the water balance in an absorption tower and the concentration of the $CO_2$ absorption liquid which circulates within the system is kept at a prescribed concentration.

13 Claims, 10 Drawing Sheets

(52) U.S. Cl.
CPC ........... *B01D 61/147* (2013.01); *B01D 65/02* (2013.01); *B01D 2252/103* (2013.01); *B01D 2252/204* (2013.01); *B01D 2257/504* (2013.01); *B01D 2258/0283* (2013.01); *B01D 2321/18* (2013.01); *Y02C 10/06* (2013.01)

(58) Field of Classification Search
CPC ............ B01D 2321/18; B01D 53/1412; B01D 53/1425; B01D 53/1475; B01D 61/147; B01D 65/02; Y02C 10/06
See application file for complete search history.

(56) References Cited

U.S. PATENT DOCUMENTS

| | | |
|---|---|---|
| 2008/0203036 A1 | 8/2008 | Iijima et al. |
| 2009/0193970 A1* | 8/2009 | Iijima ................ B01D 53/1406 95/186 |
| 2010/0092359 A1 | 4/2010 | Svendsen et al. |
| 2011/0056377 A1 | 3/2011 | Moniwa et al. |

FOREIGN PATENT DOCUMENTS

| | | |
|---|---|---|
| EP | 2 085 133 A1 | 8/2009 |
| JP | 55-97227 A | 7/1980 |
| JP | 58-8501 A | 1/1983 |
| JP | 58-58825 U | 4/1983 |
| JP | 5-245339 A | 9/1993 |
| JP | 2008-207123 A | 9/2008 |
| JP | 2009-179546 A | 8/2009 |
| JP | 2011-56399 A | 3/2011 |
| JP | 2013-208533 A | 10/2013 |
| WO | 2008/072979 A1 | 6/2008 |

* cited by examiner

$CO_2$ RECOVERY DEVICE AND METHOD FOR CLEANING FILTRATION MEMBRANE DEVICE OF $CO_2$ RECOVERY DEVICE

TECHNICAL FIELD

The present invention relates to a $CO_2$ recovery device and a method for cleaning a filtration membrane device of a $CO_2$ recovery device that reduces the loss of an absorption liquid when filtering solid contents containing, for example, dust and soot or fly ash, which remain in a $CO_2$ absorption liquid which removes $CO_2$ or the like in exhaust gas.

BACKGROUND ART

In recent years, as one of the causes of the global warming phenomenon, the greenhouse effect caused by $CO_2$ has been pointed out, and countermeasures thereagainst have also been a pressing need internationally in order to protect the environment of earth. As generation sources of $CO_2$, in the fields of activity of all human beings which combust fossil fuels, the need for suppression of emission of $CO_2$ tends to become stronger. Along with this, methods of bringing combusted exhaust gas of boilers into contact with an amine-based $CO_2$ absorption liquid and eliminating and recovering $CO_2$ in the combusted exhaust gas, and methods of storing the recovered $CO_2$ without being emitted to atmospheric air have been energetically studied for, for example, power generation facilities, such as thermoelectric power plants that use a large quantity of fossil fuels.

Additionally, as a method of removing and recovering $CO_2$ from a combustion exhaust gas, using the $CO_2$ absorption liquid as above, there is adopted a method including a step of bringing the combustion exhaust gas into contact with the $CO_2$ absorption liquid in an absorption tower; and a step of heating an absorption liquid which has absorbed $CO_2$ in a regeneration tower, separating $CO_2$, and regenerating the $CO_2$ absorption liquid, and circulating the regenerated $CO_2$ absorption liquid again to the absorption tower and reusing the regenerated $CO_2$ absorption liquid (PTL 1).

Meanwhile, in $CO_2$ recovery devices, it is necessary to reduce the consumption amount of steam for regeneration of an absorption liquid, and achieve further energy saving. Additionally, in a case where solid contents, such as dust in exhaust gas, are accumulated in the absorption liquid, when the solid contents are separated and removed from the absorption liquid, reducing the amount of loss of the absorption liquid adhering to discharged solid contents and efficiently removing the solid contents from the absorption liquid are challenges.

For this reason, the related art suggests carrying out normal cleaning of a filter using water containing a low-concentration $CO_2$ absorption liquid, thereby removing the solid contents (PTL 2).

CITATION LIST

Patent Literature

[PTL 1] Japanese Unexamined Patent Application Publication No. 5-245339
[PTL 2] Japanese Unexamined Patent Application Publication No. 2009-179546

SUMMARY OF INVENTION

Technical Problem

However, in the suggestion of PTL 2, the low-concentration $CO_2$ absorption liquid is included as a cleaning liquid. Thus, there is a problem in that, when the filter is cleaned, the absorption liquid adheres to the solid contents, and is discharged to the outside, and consequently the loss of the absorption liquid occurs.

Therefore, when the filter is cleaned, the appearance of techniques of reducing the amount of loss of the absorption liquid adhering to the discharged solid contents and enhancing the removal efficiency of the solid contents in the absorption liquid is earnestly desired.

The invention has been made in view of the above problems, and an object thereof is to provide a $CO_2$ recovery device and a method for cleaning a filtration membrane device of a $CO_2$ recovery device that reduce the loss of an absorption liquid when filtering solid contents containing, for example, dust and soot or fly ash, which remain in a $CO_2$ absorption liquid which removes $CO_2$ or the like in exhaust gas.

Solution to Problem

A first invention of the invention for solving the above-described problems is a $CO_2$ recovery device including an absorption tower which brings an exhaust gas containing $CO_2$ into contact with a $CO_2$ absorption liquid to remove $CO_2$; an absorption liquid regeneration tower which regenerates a rich solution, which has absorbed $CO_2$, through heat exchange; a rich solution supply line through which the rich solution is extracted from the absorption tower and is introduced into the absorption liquid regeneration tower side; a lean solution supply line through which a lean solution into which $CO_2$ regenerated in the absorption liquid regeneration tower has been emitted is extracted from the absorption liquid regeneration tower, and is introduced into the absorption tower, and the lean solution is reused as the $CO_2$ absorption liquid in the absorption tower; and a filtration membrane device which is interposed in a lean solution branch line branched from the lean solution supply line, the rich solution supply line, or both the solution supply lines, collects solid contents remaining in the branched solution using a filter, and returns filtrate, which has passed through the filter, to the solution supply line. With respect to the filtration membrane device when the filter has been used to collect the solid contents, the filter is cleaned using a low-concentration $CO_2$ absorption liquid as cleaning water, the low-concentration $CO_2$ absorption liquid circulating within a system; rough cleaning, which returns the low-concentration $CO_2$ absorption liquid used for cleaning to the solution supply line, is performed; the filter is finish-cleaned by cleaning water which does not include the $CO_2$ absorption liquid and which is from outside the system; the $CO_2$ absorption liquid which is adhered to the collected solid contents is cleaned and removed; finish-cleaning water which includes the $CO_2$ absorption liquid is returned to the solution supply line; the moisture content within the system is maintained at a prescribed value by adjusting the water balance within the absorption tower; and the concentration of the $CO_2$ absorption liquid which circulates within the system is kept at a prescribed concentration.

A second invention based on the first invention is the $CO_2$ recovery device in which the water balance within the absorption tower is adjusted by controlling the temperature of the cleaning water in a cleaning section.

A third invention based on the first invention is the $CO_2$ recovery device in which the water balance in the absorption tower is adjusted by controlling the temperature of cooling water in a cooling tower which cools the exhaust gas containing $CO_2$ before being introduced into the absorption tower.

A fourth invention based on any one invention of the first to third inventions is the $CO_2$ recovery device in which the absorption liquid regeneration tower includes a separation drum which condenses steam in emission gas containing $CO_2$ gas that has entrained the steam discharged from the top of the absorption liquid regeneration tower, and separates water. The absorption tower includes a CO2 recovery section which brings the exhaust gas containing $CO_2$ into contact with the CO2 absorption liquid to absorb $CO_2$ in the exhaust gas; at least one or more cleaning sections which are disposed on an upper stage side of the $CO_2$ recovery section, cool $CO_2$-removed exhaust gas from which $CO_2$ has been removed, and recover an entrained $CO_2$ absorption liquid using the cleaning water; and a condensed water receiving section which is disposed on a lower side of each of the cleaning sections, and recovers condensed water within the cleaning section. A low-concentration $CO_2$ absorption liquid in any one or both of the condensed water recovered in the condensed water receiving section of the absorption tower and the water separated in the separation drum is used as the cleaning water of the rough cleaning.

A fifth invention based on any one invention of the first to fourth inventions is the $CO_2$ recovery device in which the solid contents collected by the filter are removed by performing reverse washing using gas or a cleaning liquid supplied from the outside of the system.

A sixth invention based on any one invention of the first to fifth inventions is the $CO_2$ recovery device in which at least two systems of the filters are provided, and the solid contents in the $CO_2$ absorption liquid are alternately collected.

A seventh invention based on any one invention of the first to sixth inventions is the $CO_2$ recovery device in which the $CO_2$ absorption liquid is an amine-based absorption liquid.

An eighth invention is a method for cleaning a filtration membrane device of a CO2 recovery device which regenerates a rich solution, which has absorbed $CO_2$, in a regeneration tower after $CO_2$ is removed by bringing an exhaust gas containing $CO_2$ into contact with a $CO_2$ absorption liquid within a $CO_2$ recovery section of an absorption tower and which filters solid contents remaining in a lean solution, from which the regenerated $CO_2$ has been removed, using a filter provided in a filtration membrane device. The method includes supplying a low-concentration $CO_2$ absorption liquid circulating within a system to the filtration membrane device, rough-cleaning the filter using the low-concentration $CO_2$ absorption liquid, returning the low-concentration $CO_2$ absorption liquid, which has cleaned the filter, again to the system, finish-cleaning the filter using a cleaning liquid which does not include the $CO_2$ absorption liquid from the outside of the system, and returning the low-concentration $CO_2$ absorption liquid, which has cleaned the filter, again to the inside of the system; and thereafter, adjusting the content of moisture increased by supplying cleaning water from the outside of the system, and maintaining the balance of the water circulating within the system.

A ninth invention based on the eighth invention is the method for cleaning a filtration membrane device of a $CO_2$ recovery device in which a low-concentration $CO_2$ absorption liquid in any one or both of condensed water recovered in a condensed water receiving section of the absorption tower and water separated in a separation drum is used as the cleaning water.

A tenth invention based on the eighth or ninth invention is the method for cleaning a filtration membrane device of a $CO_2$ recovery device in which the $CO_2$ absorption liquid is an amine-based absorption liquid.

An eleventh invention based on any one invention of the eighth to tenth inventions is the method for cleaning a filtration membrane device of a $CO_2$ recovery device in which the water balance within the absorption tower is adjusted by controlling the temperature of the cleaning water in the cleaning section.

A twelfth invention based on any one invention of the eighth to tenth inventions is the method for cleaning a filtration membrane device of a $CO_2$ recovery device in which the water balance in the absorption tower is adjusted by controlling the temperature of cooling water in a cooling tower which cools the exhaust gas containing $CO_2$ before being introduced into the absorption tower.

Advantageous Effects of Invention

According to the invention, there is provided the filtration membrane device that cleans the $CO_2$ absorption liquid adhering to the filter and the $CO_2$ absorption liquid adhering to the solid contents, using the cleaning water which does not include the $CO_2$ absorption liquid supplied from the outside, when the solid contents remaining in the $CO_2$ absorption liquid are filtered by the filter. Accordingly, by returning the cleaning water, which has cleaned the filter, again to the inside of the system and adjusting the increased moisture content, the balance of water circulating within the system can be maintained, and the filter can be cleaned without diluting the $CO_2$ absorption liquid with water as a result of the cleaning. Additionally, since the solid contents to which the $CO_2$ absorption liquid has adhered are discharged to the outside of the system, a decrease in the concentration of the $CO_2$ absorption liquid can be prevented, and the loss of the $CO_2$ absorption liquid can be markedly reduced.

BRIEF DESCRIPTION OF DRAWINGS

FIG. 2-1 is a schematic view of the operation process of the filtration membrane device related to the present embodiment.

FIG. 2-2 is a schematic view of the operation process of the filtration membrane device related to the present embodiment.

FIG. 2-3 is a schematic view of the operation process of the filtration membrane device related to the present embodiment.

FIG. 2-4 is a schematic view of the operation process of the filtration membrane device related to the present embodiment.

FIG. 2-5 is a schematic view of the operation process of the filtration membrane device related to the present embodiment.

DESCRIPTION OF EMBODIMENTS

Preferred embodiments of the invention will be described below in detail with reference to the accompanying drawings. In addition, the invention is not limited by the embodiments and includes those configured by combining respective embodiments when there are a plurality of embodiments.

Embodiment 1

Figure 1:
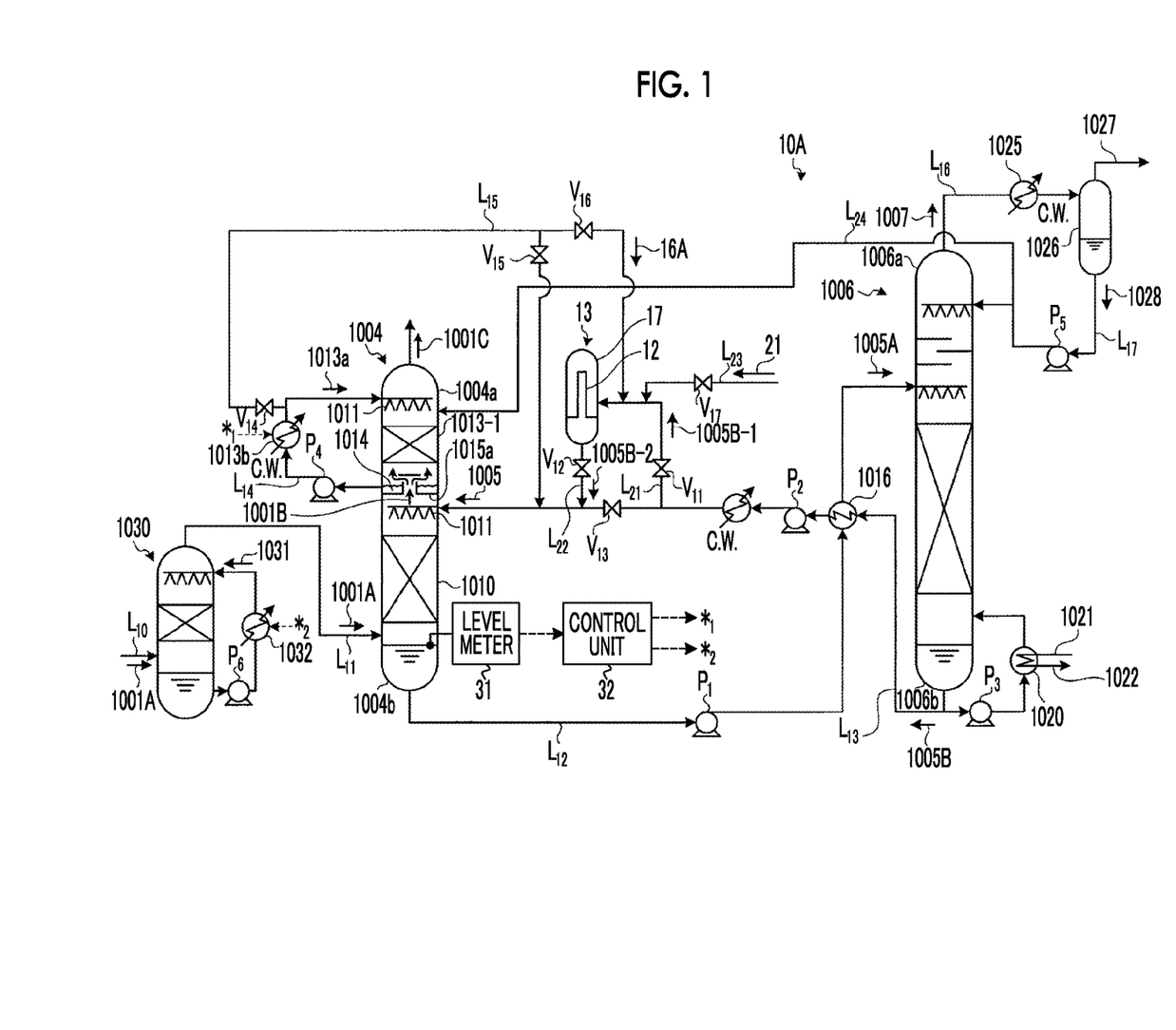
FIG. 1 is a schematic view of a $CO_2$ recovery device related to Embodiment 1.

FIG. 1 is a schematic view of the $CO_2$ recovery device related to Embodiment 1. As illustrated in FIG. 1, a $CO_2$ recovery device 10A related to the present embodiment includes an absorption tower 1004 which brings exhaust gas 1001A containing $CO_2$ into contact with a $CO_2$ absorption liquid 1005 to remove $CO_2$; an absorption liquid regeneration tower 1006 which regenerates a rich solution 1005A, which has absorbed $CO_2$, through heat exchange; a rich solution supply line $L_{12}$ through which the rich solution 1005A is extracted from the absorption tower 1004 and is introduced into the absorption liquid regeneration tower 1006 side; a lean solution supply line $L_{13}$ through which a lean solution 1005B into which $CO_2$ regenerated in the absorption liquid regeneration tower 1006 has been emitted is extracted from the absorption liquid regeneration tower 1006, and is introduced into the absorption tower 1004, and the lean solution 1005B is reused as the $CO_2$ absorption liquid in the absorption tower 1004; and a filtration membrane device 13 which is interposed in a lean solution branch line $L_{21}$ branched from the lean solution supply line $L_{13}$, collects solid contents 11 remaining in the branched lean solution 1005B-1 using the filter 12, and returns filtrate 1005B-2, which has passed through the filter 12, to the lean solution supply line $L_{13}$. With respect to the filtration membrane device 13 when the filter 12 has been used to collect the solid contents 11, the filter 12 is cleaned using a low-concentration $CO_2$ absorption liquid as cleaning water (containing the absorption liquid) 16A, the low-concentration $CO_2$ absorption liquid circulating within a system; rough cleaning, which returns the low-concentration $CO_2$ absorption liquid used for cleaning to the lean solution supply line $L_{13}$, is performed; the filter 12 is finish-cleaned by cleaning water 21 which does not include the $CO_2$ absorption liquid and which is from outside the system; the $CO_2$ absorption liquid which is adhered to the collected solid contents 11 is washed and removed; finish-cleaning water which includes the $CO_2$ absorption liquid is returned to the lean solution supply line $L_{13}$; the moisture content within the system is maintained at a prescribed value by adjusting the water balance within the absorption tower 1004; and the concentration of the $CO_2$ absorption liquid which circulates within the system is kept at a prescribed concentration.

In the present embodiment, the absorption liquid regeneration tower 1006 includes a separation drum 1026 which condenses steam in emission gas 1007 containing $CO_2$ gas that has entrained the steam discharged from the top of the absorption liquid regeneration tower as condensed water 1028, and separates the condensed water 1028. Additionally, the absorption tower 1004 includes a $CO_2$ recovery section 1010 which brings the exhaust gas containing $CO_2$ into contact with the $CO_2$ absorption liquid to absorb $CO_2$ in the exhaust gas 1001A containing $CO_2$; a first cleaning section 1013-1 which is disposed on an upper stage side of the $CO_2$ recovery section 1010, cools $CO_2$-removed exhaust gas 1001B from which $CO_2$ has been removed, and recovers an entrained $CO_2$ absorption liquid using cleaning water 1013a; and a condensed water receiving section 1015a which is disposed on a lower side of the first cleaning section 1013-1, and recovers condensed water 1014 generated within the first cleaning section 1013-1. As the cleaning water 1013a used in the first cleaning section 1013-1, a portion of the condensed water 1028 separated by the separation drum 1026 is supplied by a condensed water supply line $L_{24}$.

Also, in the present embodiment, a portion of the condensed water 1014 which includes the $CO_2$ absorption liquid 1005 recovered in the condensed water receiving section 1015a is used as cleaning water 16A which cleans the filter 12 so as to be supplied to the filtration membrane device 13 via a cleaning water supply line $L_{15}$.

In a $CO_2$ recovery method using the $CO_2$ recovery device 10A, in the absorption tower 1004, the $CO_2$-containing exhaust gas 1001A comes into countercurrent contact with the $CO_2$ absorption liquid 1005 supplied from nozzles 1011 that are liquid dispersers, in the $CO_2$ recovery section 1010 provided on a lower part side of the absorption tower 1004, and $CO_2$ in the $CO_2$-containing exhaust gas 1001A is absorbed by the $CO_2$ absorption liquid 1005 according to, for example, a chemical reaction (R—$NH_2$+$H_2O$+$CO_2$→R—$NH_3HCO_3$).

Then, the $CO_2$-removed exhaust gas 1001B after $CO_2$ has been removed comes into gas-liquid contact with the cleaning water 1013a which includes the $CO_2$ absorption liquid 1005 supplied from the nozzles 1011 in the first cleaning section 1013-1, and the $CO_2$ absorption liquid 1005 entrained in the $CO_2$-removed exhaust gas 1001B is recovered. Additionally, the condensed water 1014 which includes the $CO_2$ absorption liquid 1005 recovered in the condensed water receiving section 1015a is supplied via the first liquid circulation line $L_{14}$, and is reused as the cleaning water for the first cleaning section 1013-1.

The rich solution 1005A with high $CO_2$ concentration into which $CO_2$ has been absorbed is supplied to the absorption liquid regeneration tower 1006 side via the rich solution supply line $L_{12}$ by a rich solvent pump $P_1$, is introduced into the tower from the vicinity of a tower top 1006a of the absorption liquid regeneration tower 1006, and causes an endothermic reaction with steam indirectly heated with saturated water vapor 1021 in a reboiler 1020 when flowing downward within the tower, and most of the $CO_2$ is emitted and regenerated. In addition, the saturated water vapor 1021 is discharged as condensed water 1020 from the reboiler 1020.

Additionally, the $CO_2$ gas 1007 that has entrained the steam discharged from the rich solution 1005A inside the tower is led out from the tower top 1006a of the absorption liquid regeneration tower 1006. Then, with respect to the $CO_2$ gas 1007 that has entrained the steam, the steam is condensed by a cooling section 1025, water is separated as the condensed water 1028 by the separation drum 1026, and only the $CO_2$ gas 1027 is discharged and recovered to the outside of the system. The condensed water 1028 separated by the separation drum 1026 is supplied to an upper part of the absorption liquid regeneration tower 1006, an upper part of the absorption tower 1004, and the like, and adjusts water balance within the closed system.

The lean solution 1005B with low $CO_2$ concentration regenerated in the absorption liquid regeneration tower 1006 is subjected to heat exchange with the rich solution 1005A by a heat exchanger 1016 and is cooled, is then raised in pressure by a lean solvent pump $P_2$, and is further cooled by the lean solvent cooler. Thereafter, the lean solution is supplied again to the absorption tower 1004 and is circulated and reused as a $CO_2$ absorption liquid.

In the present embodiment, when such $CO_2$ recovery is performed and when there is an improvement in the concentration of the solid contents 11 in the lean solution 1005B, the lean solution 1005B-1 is introduced into the filtration membrane device 13, and the solid contents 11 remaining in the lean solution 1005B-1 are collected by the filter 12, so that the lean solution 1005B-2 from which the solid contents 11 have been removed can be supplied to the lean solution supply line $L_{13}$.

Accordingly, the concentration of the solid contents in the $CO_2$ absorption liquid which circulates through the absorption tower 1004 and the absorption liquid regeneration tower 1006 can be reduced.

Next, the removal operation of the solid contents 11 in the filtering device 13 and the cleaning operation of the filter 12 will be described.

FIGS. 2-1 to 2-5 are schematic views of an operation process of the filtration membrane device related to the present embodiment.

Figure 21:
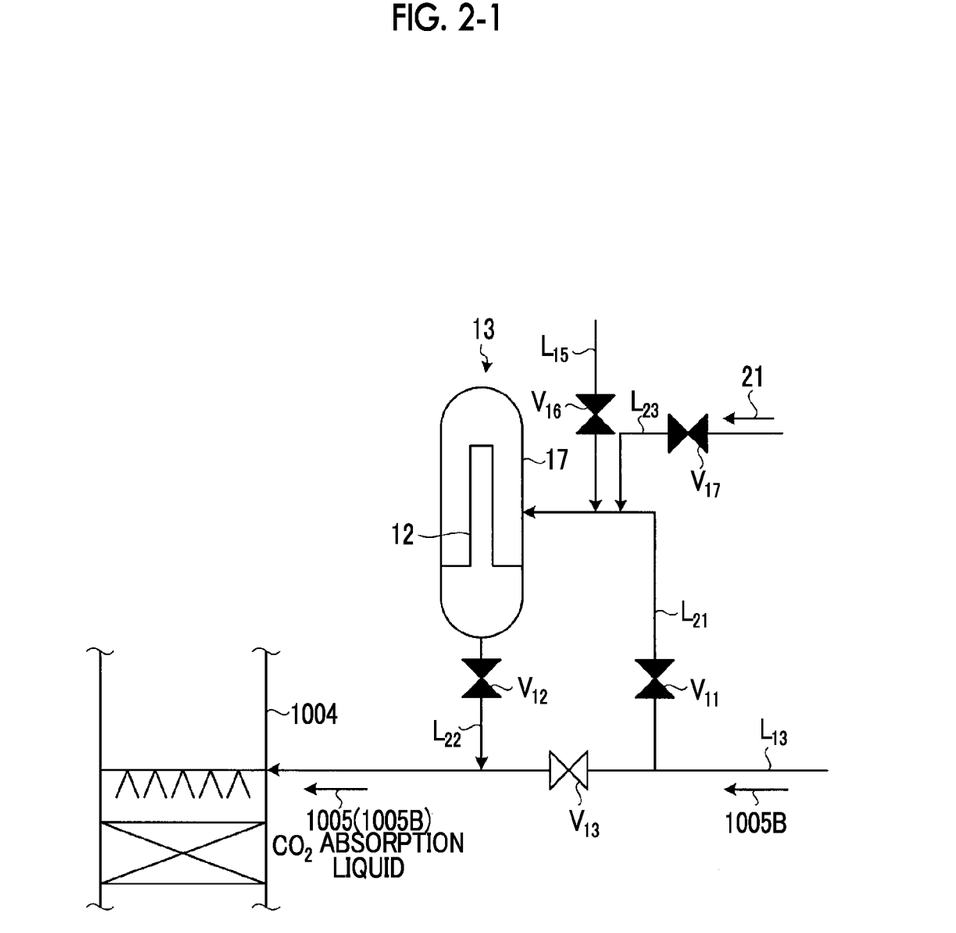

In a normal $CO_2$ recovery operation, as illustrated in FIG. 2-1, when circulation is made through the absorption tower 1004 and the absorption liquid regeneration tower 1006, the $CO_2$ absorption liquid 1005 (lean solution 1005B) is circulated and reused within the closed system by closing valves $V_{11}$ and $V_{12}$ and releasing a valve $V_{13}$.

Figure 22:
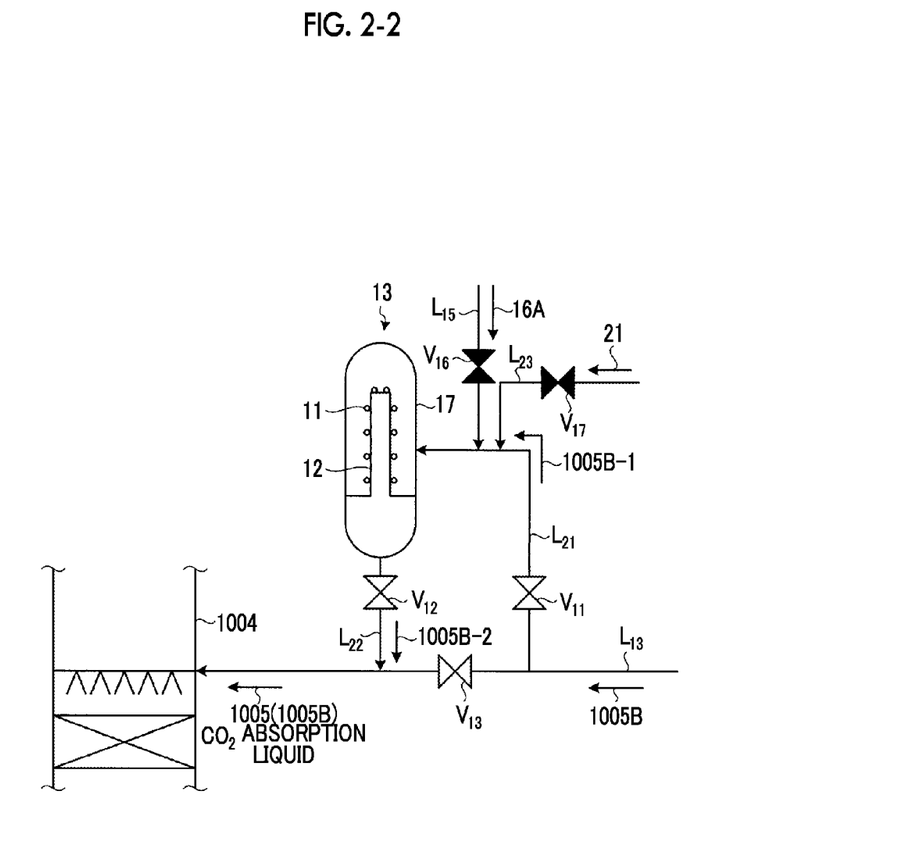

In contrast, in the operation of removing the solid contents 11, as illustrated in FIG. 2-2, the valves $V_{11}$ and $V_{12}$ are opened while the lean solution 1005B-1 is filtered by the filtration membrane device 13. Accordingly, the lean solution 1005B-1 which has been partly extracted from the lean solution supply line $L_{13}$ is supplied into a filtration membrane device body 17 via the lean solution branch line $L_{21}$ through which the lean solution 1005B-1 is supplied to the filtration membrane device 13 side, and the solid contents 11 remaining in the lean solution 1005B-1 are collected by the filter 12. Then, the lean solution 1005B-2 from which the solid contents 11 have been removed is supplied to the lean solution supply line $L_{13}$ via the lean solution branch line $L_{21}$.

Figure 23:
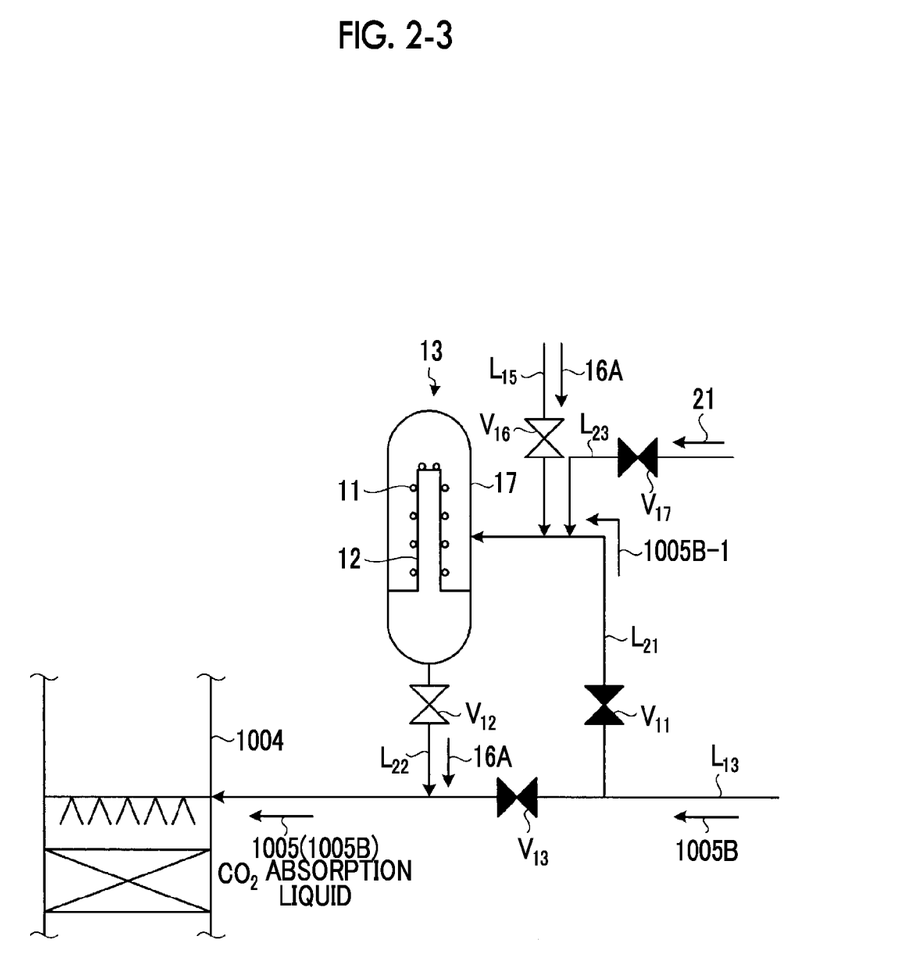

Next, after the separation of the solid contents 11 is completed, as illustrated in FIG. 2-3, a valve $V_{16}$ of the cleaning water supply line $L_{15}$ is released, and the low-concentration $CO_2$ absorption liquid circulating within the system is supplied into the filter device body 17 as the cleaning water 16A. By virtue of the supply of the cleaning water 16A, the $CO_2$ absorption liquid adhering to the filter 12 is recovered in the cleaning water 16A, and rough cleaning of the filter 12 is performed.

Figure 24:
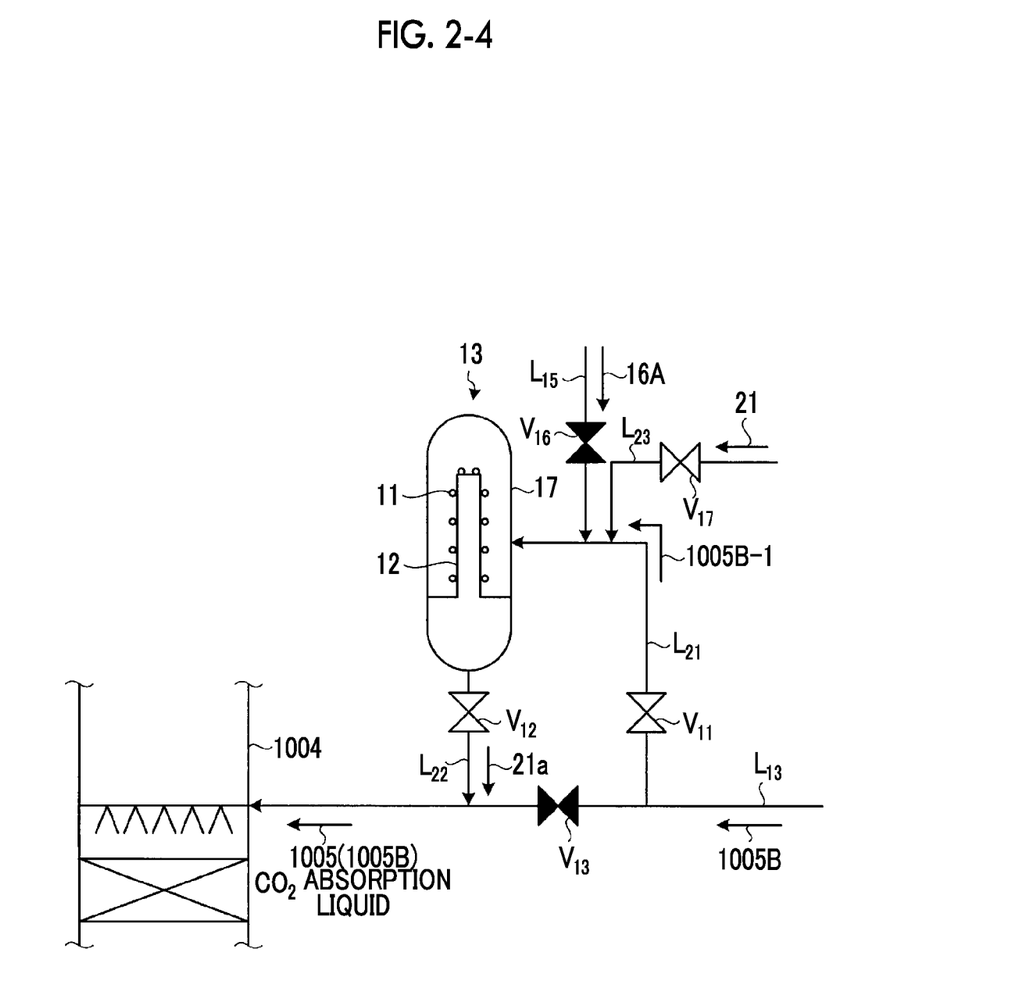

After this rough cleaning is completed, as illustrated in FIG. 2-4, the valve $V_{16}$ of the cleaning water supply line $L_{15}$ is closed, a valve $V_{17}$ of a cleaning water supply line $L_{23}$ is released, and the cleaning water 21 which does not include the $CO_2$ absorption liquid is supplied into the filtration membrane device body 17. Finish cleaning which cleans and removes the $CO_2$ absorption liquid adhering to the filter 12 and the solid contents 11 is performed by the cleaning water 21 which does not include the $CO_2$ absorption liquid supplied from the outside.

By performing this finish cleaning, the $CO_2$ absorption liquid adhering to the filter 12 and the solid contents 11 which could not be removed in the rough cleaning can be cleaned and removed.

The finish-cleaning water 21a which includes the $CO_2$ absorption liquid which has performed this finish cleaning is supplied to the lean solution supply line $L_{13}$ via a return line $L_{22}$, and is introduced into the absorption tower 1004.

Since the water from the outside is introduced as a result of introducing the finish-cleaning water 21a into the absorption tower 1004, the amount of water within the closed system increases. Hence, in the present embodiment, the operation of adjusting the water balance within the absorption tower 1004 to keep the moisture content within the system at a prescribed value, and keeping the concentration of the $CO_2$ absorption liquid circulating within the system at a prescribed concentration is performed.

Next, the adjustment operation of the water balance of the $CO_2$ absorption liquid will be described referring to FIG. 1.

A first adjustment operation of the water balance of the $CO_2$ absorption liquid is performed by controlling the temperature of the cleaning water 1013a in the first cleaning section 1013-1. Specifically, the temperature of the cleaning water 1013a in the first cleaning section 1013-1 is adjusted in a heat exchange unit 1013b. Specifically, the amount of entrainment of water into the $CO_2$-absorption-solution-removed exhaust gas 1001C is increased by maintaining a high heat exchange temperature in the heat exchange unit 1013b when heat exchange of the cleaning water 1013a is performed and by evaporating the moisture in the cleaning water 1013a when passing through the first cleaning section 1013-1. Accordingly, the moisture content discharged to the outside of the system is increased.

In addition, as confirmation of the water balance, the amount of stored water within a water storage part 1004b of the bottom part of the absorption tower 1004 is measured by a level meter 31. Then, as a result of the measurement of the level meter 31, a command is issued from a control unit 32 so that a command ($X_1$) of adjusting the temperature in the heat exchange unit 1013b becomes proper and so that the water balance becomes proper. Here, as in the present embodiment, a worker operates the water balance properly without using the control unit 32.

Hence, in the related art, the cleaning of the filter 12 is performed using the cleaning water 1013a with a low-concentration $CO_2$ absorption liquid, as the cleaning water 16A. However, since the $CO_2$ absorption liquid could not be removed to a value equal to or lower than the concentration even at a low concentration, discharged solid contents were discarded to the outside with the $CO_2$ absorption liquid adhered thereto, and there was loss of the $CO_2$ absorption liquid.

In contrast, in the present invention, the finish cleaning of the filter 12 is performed using the cleaning water 21 which does not include the $CO_2$ absorption liquid at all after the rough cleaning is performed using the cleaning water 1013a with the low-concentration $CO_2$ absorption liquid as the cleaning water 16A. Thus, in the related art, the $CO_2$ absorption liquid adhering to the solid contents 11 discarded to the outside as discharged solid contents as it is can be recovered. As a result, reduction of the amount of loss of the $CO_2$ absorption liquid and efficient removal of the solid contents from the lean solution 1005B can be achieved.

Figure 3:
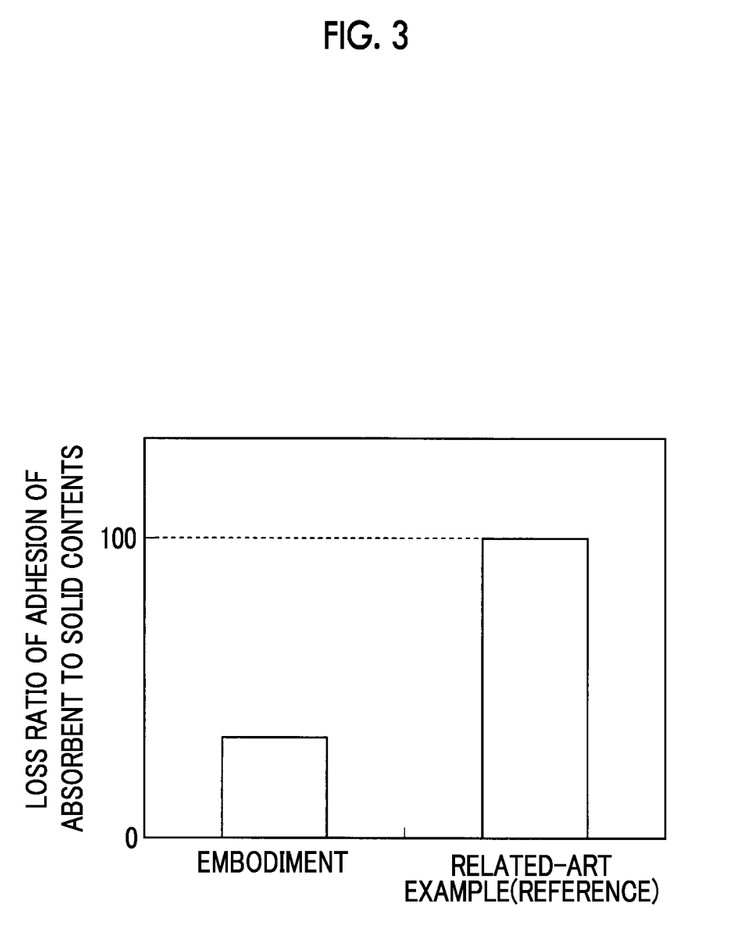
FIG. 3 is a view illustrating the comparison between the amounts of loss of $CO_2$ absorption liquid which adheres to solid contents in cleaning of filters and is discharged to the outside of a system, in the related art when a $CO_2$ absorption liquid is used, and the present embodiment when finish cleaning is performed afterward.

FIG. 3 is a view illustrating the comparison between the amounts of loss of $CO_2$ absorption liquid which adheres to solid contents in cleaning of filters and is discharged to the outside of a system, in the related art when a $CO_2$ absorption liquid is used, and the present embodiment when the finish cleaning is performed afterward.

In a case where the loss when the low-concentration $CO_2$ absorption liquid of the related art illustrated on the right side of FIG. 3 is 100, the amount of loss to be discharged to the outside of the system is reduced to ⅓ by performing both the rough cleaning and the finish cleaning on the filter 12.

Additionally, a second adjustment operation of the water balance of the $CO_2$ absorption liquid is performed by controlling the temperature of the cooling water 1031 in the cooling tower 1030, which cools the $CO_2$-containing exhaust gas 1001A before being introduced into the absorption tower 1004, using the heat exchange unit 1032. Specifically, the heat exchange temperature in the heat exchange unit 1032 which performs heat exchange of the temperature of the cooling water 1031 in the cooling tower 1030 is made low, moisture is condensed in the cooling tower 1030, and the amount of entrainment of water into the $CO_2$-containing exhaust gas 1001A is lowered so that the amount of moisture to be introduced into the absorption tower 1004 is lowered.

In addition, as confirmation of the water balance, the amount of stored water within a water storage part 1004b of the bottom part of the absorption tower 1004 is measured by a level meter 31, and a command ($X_2$) of adjusting the temperature in the heat exchange unit 1032 is issued from the control unit 32 so that the water balance becomes proper. In addition, a worker operates the water balance properly without using the control unit 32.

As a result of the adjustment of the water balance, for example, when the concentration of the $CO_2$ absorption liquid in the $CO_2$ absorption liquid 1005 is targeted at, for example, 30%, water is supplied as the cleaning water 21 from the outside, so that the $CO_2$ absorption liquid 1005 in the absorption tower 1004 is prevented from being diluted to 29%, and 30% that is a targeted management value can always be maintained.

Additionally, as the filter 12, it is preferable to use cartridge filters, precoat filters, metal slit filters, wire net filters, and sintered metal filters. However, the invention is not limited to these. For example, arbitrary filters, such as hollow fiber membranes and MF membranes (microfiltration membranes), may be used as long as the solid contents 11 in the $CO_2$ absorption liquid 1005, can be filtered.

Additionally, any of natural filtration, pressure filtration, filtration under reduced pressure, and centrifugal filtration may be applied as a filtration method.

Additionally, a method for replacing a filter when using a precoat filter as the filter 12 will be described.

Figure 4:
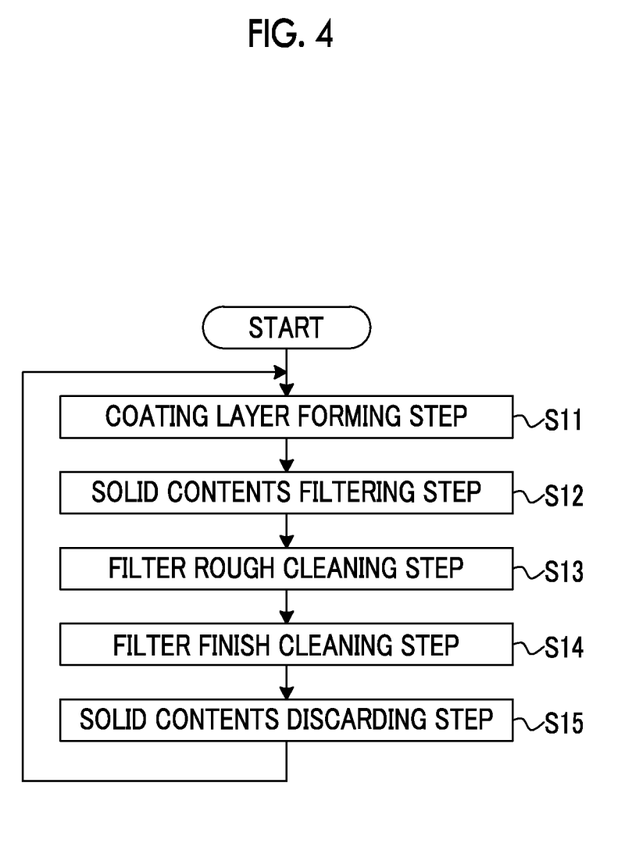
FIG. 4 is a flowchart illustrating steps of forming a coating layer on a filter and cleaning the filter.

FIG. 4 is a flowchart illustrating steps of forming a coating layer on the filter and cleaning the filter.

As illustrated in FIG. 4, when the precoat filter is used as the filter 12, the filter 12 is obtained by forming a coating layer on the filter 12, using the cleaning water 16A as a low-concentration $CO_2$ absorption liquid in which a filter medium has been dissolved.

That is, when the precoat filter is used as the filter 12, as illustrated in FIG. 4, the method includes a coating layer forming step S11 of forming a coating layer in the surface of the filter 12; a solid contents filtering step S12 of filtering and removing the solid contents 11 in the $CO_2$ absorption liquid 1005; a rough cleaning step S13 of recovering the $CO_2$ absorption liquid 1005 adhering to the surface of the filter 12, using the cleaning water 16A, and cleaning the filter 12; and a finish cleaning step S14 of performing finish cleaning of the filter 12, using the cleaning water 21 which does not include $CO_2$ supplied from the outside.

First, in the coating layer forming step S11, the coating layer is formed by dissolving a filter medium constituting the coating layer of the filter 12 in the cleaning water 16A and making the cleaning water 16A in which the filter medium has been dissolved adhere to the filter 12.

Then, in the solid contents filtering step S12, the branched $CO_2$ absorption liquid 1005B-1 is supplied to the filtration membrane device 13 via the lean solution branch line $L_{21}$, the lean solution 1005B-1 is filtered by the filter 12, and the solid contents 11 remaining in the lean solution 1005B-1 are collected. Then, the lean solution 1005B-2 from which the solid contents 11 have been removed is supplied to the lean solution supply line $L_{13}$ (refer to FIG. 2-2).

Then, in the filter rough cleaning step S13, the cleaning water 16A is supplied to the filtration membrane device 13, the $CO_2$ absorption liquid 1005 adhering to the filter 12 is recovered in the cleaning water 16A, and the rough cleaning of the filter 12 is performed (refer to FIG. 2-3).

Then, in the finish cleaning step S14, the cleaning water 21 which does not include the $CO_2$ absorption liquid is supplied from the outside to the filtration membrane device 13, the $CO_2$ absorption liquid 1005 adhering to the filter 12 is collected in the cleaning water 21, the filter 12 is cleaned, and the $CO_2$ absorption liquid adhering to the solid contents 11 collected in the filter is recovered (refer to FIG. 2-4). Accordingly, reduction of the amount of loss of the absorption liquid adhering to the discharged solid contents and efficient removal of the solid contents from the $CO_2$ absorption liquid can be achieved.

After this series of cleaning of the filter 12 is completed, the coating layer to which the solid contents 11 and the solid contents 11 adhere are discarded (S15).

Figure 25:
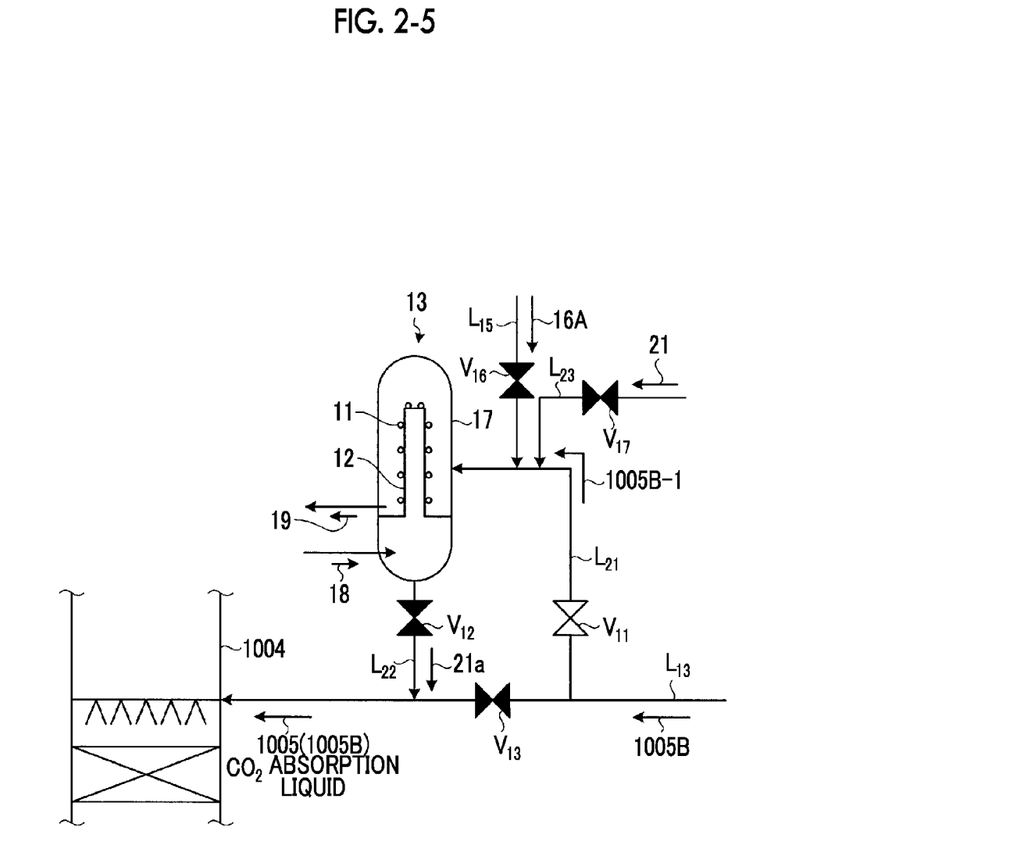

In this solid contents discarding step S15, the cleaning water 21 is first drained, and air is supplied from the same direction as normal cleaning to perform drying. Thereafter, compressed air 18 is supplied into the filtration membrane device body 17 from a reverse direction, the filter medium is blown away, and the coating layer is removed as waste 19 (refer to FIG. 2-5).

The removed filter medium is discarded to the outside as the waste 19. However, since the $CO_2$ absorption liquid adhering to the filter medium and the solid contents collected by this filter medium are removed, the waste loss of the $CO_2$ absorption liquid is almost eliminated in the filter cleaning operation.

Then, similar to the above-described one, a coating layer is newly formed again on the filter 12, using the cleaning water 16A in which the filter medium has been dissolved.

If the amount of exhaust gas is, for example, 1,000,000 $Nm^3/H$, and the general amount of dust and soot is 5.0 $mg/Nm^3$, it is necessary to remove the dust and soot, which has not been removed in the cooling tower 1030 or a desulfurization device (not illustrated), in the absorption tower 1004. In this case, the amount of dust and soot to be removed in the absorption tower 1004 becomes as large as 1,000,000 ($Nm^3/H$)×5.0 ($mg/Nm^3$)=5.0 kg/H. Additionally, generally, since the amount of collection of the dust and soot per one filter is about 100 g to 200 g, replacement of about 50 filters/H is required.

In contrast, when the filter 12 is cleaned and the coating layer is formed, the water circulating within the system is used. Accordingly, even if the amount of dust and soot removed in the absorption tower 1004 becomes large, a relatively large amount of the solid contents in the lean solution can be continuously processed in a short time.

Additionally, in the cleaning of the filter 12, the cleaning water 16A which includes the low-concentration $CO_2$ absorption liquid within the system is used, and the finish cleaning is performed using the cleaning water 21 which does not include the $CO_2$ absorption liquid from the outside of the system after the rough cleaning is performed. Thus, reduction of the amount of loss of the $CO_2$ absorption liquid adhering to the discharged solid contents and efficient removal of the solid contents from the $CO_2$ absorption liquid can be achieved.

Also, a proper $CO_2$ recovery operation is performed by adjusting the water balance in the system according to the amount of the cleaning water introduced from the outside and always maintaining the proper concentration of the $CO_2$ absorption liquid.

In this way, according to the $CO_2$ recovery device 10A related to the present embodiment, in a step of cleaning the filter 12 which has filtered the solid contents 11 remaining in the $CO_2$ absorption liquid 1005, such as amine, a decrease in the concentration of the $CO_2$ absorption liquid 1005 can be prevented, and the loss of the $CO_2$ absorption liquid 1005 can be markedly reduced.

Accordingly, it is also possible to apply the $CO_2$ recovery device invention to coal fired boilers, and even if the $CO_2$ recovery device is enlarged, and the amount of dust and soot removed in the absorption tower 1004 becomes as large as, for example, 5.0 kg/H, a relatively large amount of the solid contents in the lean solution can be continuously processed in a short time.

In the present embodiment, one filtration membrane device 13 provided with the filter 12 is provided to remove the solid contents. However, at least two systems of filtration membrane devices may be provided in parallel in the lean solution branch line $L_{21}$, the solid contents in the $CO_2$ absorption liquid may be alternately collected, cleaning is performed by the cleaning liquid 21 which does not include the $CO_2$ absorption liquid supplied from the outside of the system, and thereafter, the water balance may be adjusted.

Accordingly, since the solid contents in the lean solution can be removed by the filter 12 in the other system even when the filter 12 is cleaned by one system of the filtration membrane device 13, separation of the solid contents and regeneration of the filter 12 can be continuously and alternately performed.

As a result, continuous operation of a reduction of the amount of loss of the $CO_2$ absorption liquid adhering to the discharged solid contents, and the efficient removal of the solid contents from the $CO_2$ absorption liquid can be achieved.

In the present embodiment, a case where the lean solution 1005B is used as a solution to be supplied to the filtration membrane device 13 has been described. However, the invention is not limited to this, and the rich solution 1005A may be used. Additionally, the filter 12 may be cleaned using a solution in which both the rich solution 1005A and the lean solution 1005B are mixed together.

Embodiment 2

A $CO_2$ recovery device related to Embodiment 2 according to the invention will be described with reference to FIG. 5.

Figure 5:
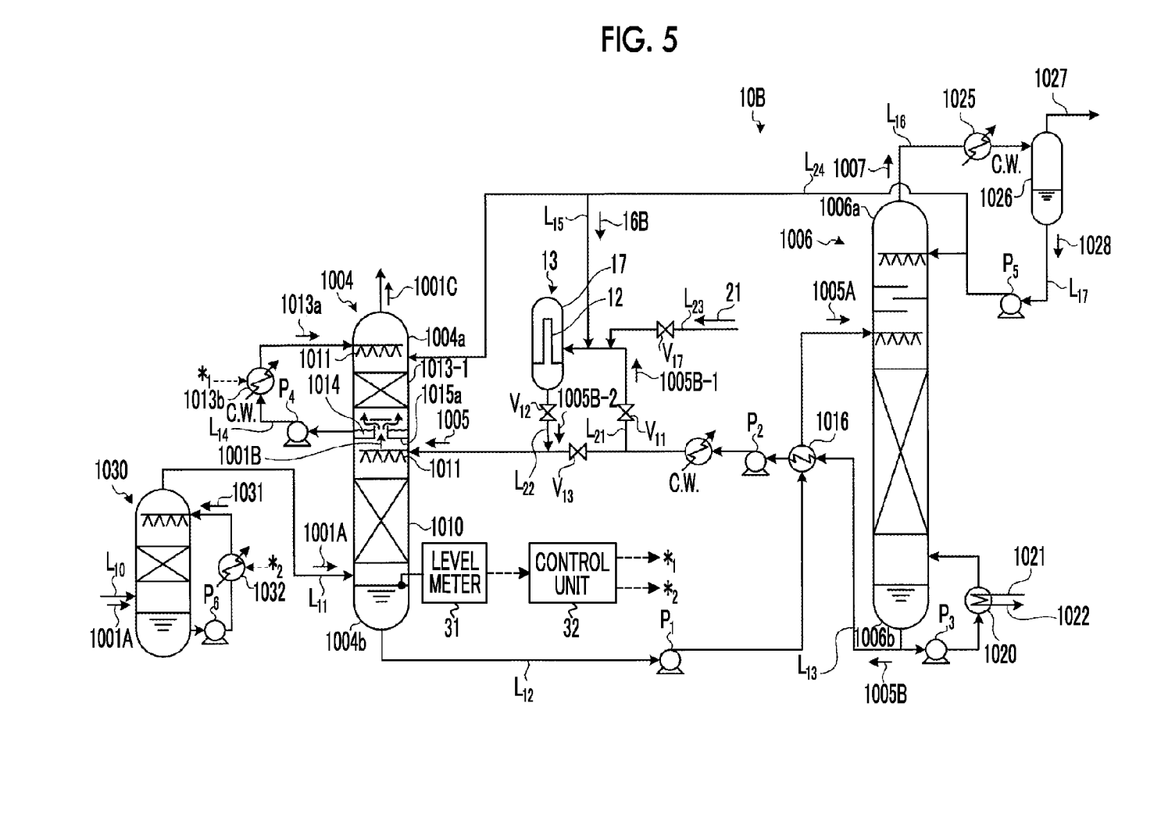
FIG. 5 is a schematic view of a $CO_2$ recovery device related to Embodiment 2.

FIG. 5 is a schematic view of the $CO_2$ recovery device related to Embodiment 2 of the invention. In the drawing, the same components as the $CO_2$ recovery device 10A of Embodiment 1 of the invention illustrated in FIG. 1 will be designated by the same reference numerals, and duplicate description will be omitted.

In Embodiment 1, the cleaning liquid 1013a in the absorption tower 1004 is used as the cleaning water which includes the low-concentration $CO_2$ absorption liquid. However, the condensed water 1028 separated by the separation drum 1026 is used as cleaning water 16B in the present embodiment.

That is, the $CO_2$ recovery device 10B related to the present embodiment, as illustrated in FIG. 5, has the cleaning water supply line $L_{15}$ branching from the condensed water supply line $L_{24}$ through which the condensed water 1028 separated by the separation drum 1026 is supplied to the lean solution branch line $L_{21}$.

Since the condensed water 1028 which includes the low-concentration $CO_2$ absorption liquid can be supplied to the lean solution branch line $L_{21}$ by providing the cleaning water supply line $L_{15}$ branching from the condensed water supply line $L_{24}$, the condensed water 1028 can be used as the cleaning water 16B.

Embodiment 3

A $CO_2$ recovery device related to Embodiment 3 according to the invention will be described with reference to FIG. 6.

Figure 6:
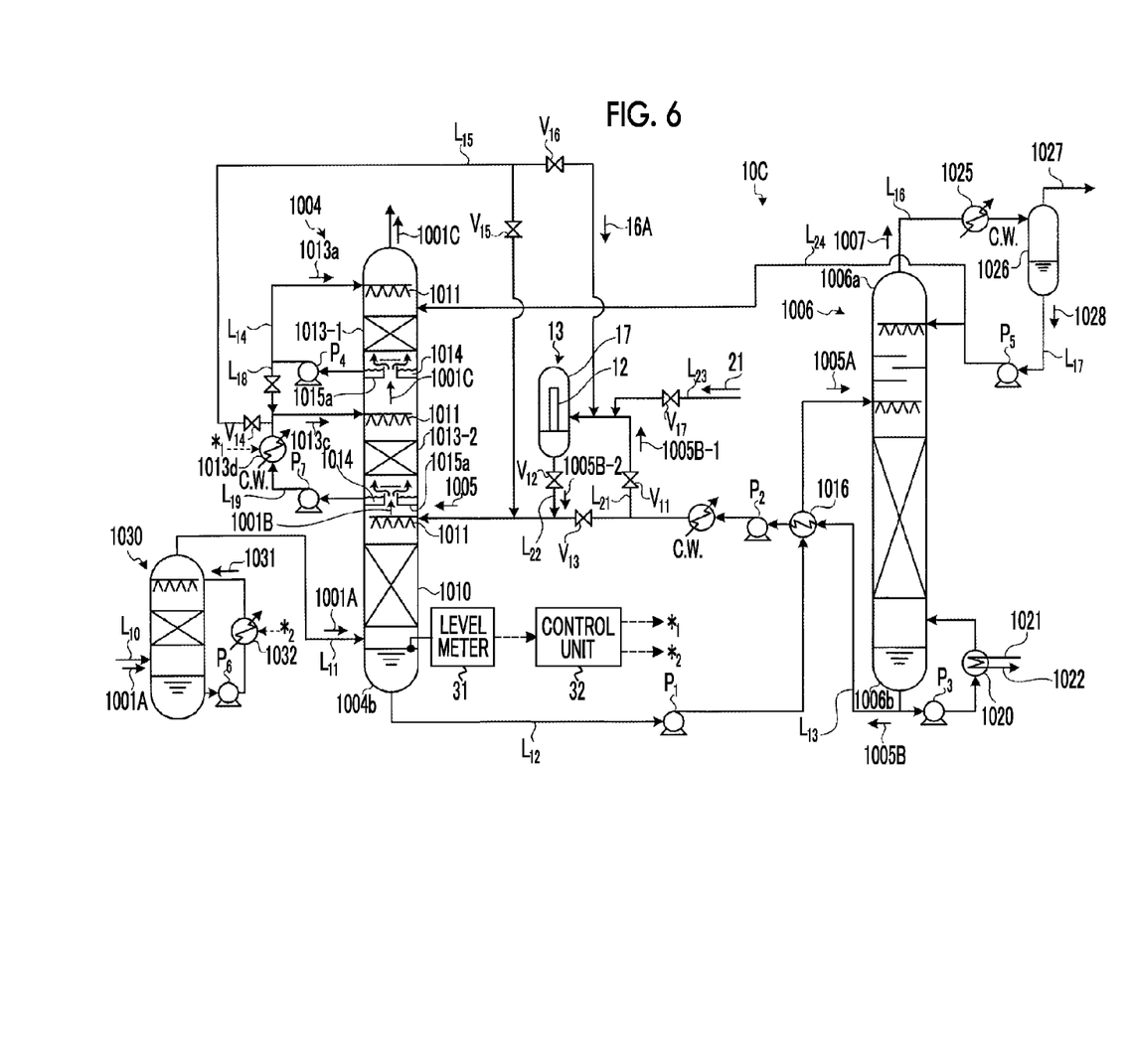
FIG. 6 is a schematic view of a $CO_2$ recovery device related to Embodiment 3.

FIG. 6 is a schematic view of the $CO_2$ recovery device related to Embodiment 3 of the invention. In the drawing, the same components as the $CO_2$ recovery device 10A of Embodiment 1 of the invention illustrated in FIG. 1 will be designated by the same reference numerals, and duplicate description will be omitted.

As illustrated in FIG. 6, in a $CO_2$ recovery device 10C related to the present embodiment, a second cleaning section 1013-2 is provided between the first cleaning section 1013-1 in Embodiment 1 and the $CO_2$ recovery section 1010.

The first cleaning section 1013-1 performs cleaning of the $CO_2$-absorption-solution-removed exhaust gas 1001C to be emitted, using the condensed water 1028 which includes the low-concentration $CO_2$ absorption liquid separated by the separation drum 1026, similar to Embodiment 1.

The second cleaning section 1013-2 supplies a portion of the condensed water 1014 from the first cleaning section 1013-1 via the supply line $L_{18}$ to the circulation line $L19$, circulates this condensed water as cleaning water $1013c$ using a pump $P_7$, and cleans and removes the $CO_2$ absorption liquid remaining in the $CO_2$-removed exhaust gas 1001B which has recovered $CO_2$ using $CO_2$ recovery section 1010.

Here, in the present embodiment, the amount of entrainment of water into the $CO_2$-absorption-solution-removed exhaust gas 1001C is increased by maintaining a high heat exchange temperature in the heat exchange unit $1013d$ interposed in the circulation line $L_{19}$ when heat exchange of the cleaning water $1013c$ is performed and by evaporating the moisture in the cleaning water $1003c$ when passing through the second cleaning section 1013-2. Accordingly, the moisture content discharged to the outside of the system is increased.

In the present embodiment, the cleaning water 16A is supplied from the circulation line $L_{19}$ via the cleaning water supply line $L_{15}$ to the filtration membrane device 13.

In order to prevent the cleaning performance of the finish cleaning of the first cleaning section 1013-1 on the upper stage side from degrading, the cleaning water $1013a$ in the first cleaning section 1013-1 on the upper part side of the absorption tower is not used as the cleaning water of the filter 12 of the filtration membrane device 13 unlike Embodiment 1.

REFERENCE SIGNS LIST

10A TO 10C: $CO_2$ RECOVERY DEVICE
11: SOLID CONTENT
12: FILTER

13: FILTRATION MEMBRANE DEVICE
16A, 16B: CLEANING WATER (CONTAINING ABSORPTION SOLUTION)
21: CLEANING WATER WHICH DOES NOT INCLUDE $CO_2$ ABSORPTION LIQUID (NO ABSORPTION LIQUID)
17: FILTRATION MEMBRANE DEVICE BODY
1001A: $CO_2$-CONTAINING EXHAUST GAS
1001B: $CO_2$-REMOVED EXHAUST GAS
1001C: $CO_2$-ABSORPTION-SOLUTION-REMOVED EXHAUST GAS
1004: ABSORPTION TOWER
1005: $CO_2$ ABSORPTION LIQUID
1005A: RICH SOLUTION
1005B: LEAN SOLUTION
1006: ABSORPTION LIQUID REGENERATION TOWER
1010: $CO_2$ RECOVERY SECTION
1030: COOLING TOWER
1031: COOLING WATER

The invention claimed is:

1. A $CO_2$ recovery system comprising:
an absorption tower which brings an exhaust gas containing $CO_2$ into contact with a $CO_2$ absorption liquid to remove $CO_2$;
an absorption liquid regeneration tower which regenerates a rich solution, which has absorbed $CO_2$, through heat exchange;
a rich solution supply line through which the rich solution is extracted from the absorption tower and is introduced into the absorption liquid regeneration tower;
a lean solution supply line through which a lean solution from which $CO_2$ regenerated in the absorption liquid regeneration tower has been emitted is extracted from the absorption liquid regeneration tower, and is introduced into the absorption tower, and the lean solution is reused as the $CO_2$ absorption liquid in the absorption tower; and
a filtration membrane device which is interposed in a lean-solution branch line branched from the lean solution supply line, a rich solution branch line branched from the rich solution supply line, or both the solution branch lines, and collects solid contents remaining in a branched solution using a filter, and returns filtrate, which has passed through the filter, to the lean solution supply line, the rich solution supply line or both the solution supply lines;
wherein the filtration membrane device in which the filter has been used to collect the solid contents is configured to rough-clean the filter by using cleaning water containing $CO_2$ absorption liquid circulating within a system; return rough-cleaning water to the lean solution supply line, the rich solution supply line or both the solution supply lines; finish-clean the filter by using cleaning water which does not include the $CO_2$ absorption liquid and which is from outside the system to wash out and remove the $CO_2$ absorption liquid which is adhered to the collected solid contents; return finish-cleaning water which includes the $CO_2$ absorption liquid to the lean solution supply line, the rich solution supply line or both the solution supply lines; maintain a moisture content in the system at a prescribed value by adjusting a water balance in the absorption tower; and keep a concentration of the $CO_2$ absorption liquid which circulates within the system at a prescribed concentration.

2. The $CO_2$ recovery system according to claim 1, wherein the absorption tower is configured to adjust the water balance therein by controlling the temperature of cleaning water in a cleaning section.

3. The $CO_2$ recovery system according to claim 1, wherein the absorption tower is configured to adjust the water balance therein by controlling the temperature of cooling water in a cooling tower which cools the exhaust gas containing $CO_2$ before being introduced into the absorption tower.

4. The $CO_2$ recovery system according to claim 1, wherein the absorption liquid regeneration tower includes:
a separation drum which condenses steam in emission gas containing $CO_2$ gas that has entrained the steam discharged from a top of the absorption liquid regeneration tower, and separates condensed water,
wherein the absorption tower includes:
a $CO_2$ recovery section which brings the exhaust gas containing $CO_2$ into contact with the $CO_2$ absorption liquid to absorb $CO_2$ in the exhaust gas;
at least one or more cleaning sections which are disposed on a downstream side of the $CO_2$ recovery section with respect to an exhaust gas flow, cool $CO_2$-removed exhaust gas from which $CO_2$ has been removed, and recover an entrained $CO_2$ absorption liquid using the cleaning water; and
a condensed water receiving section which is disposed on a bottom side of each of the cleaning sections, and recovers condensed water within the cleaning section, and
wherein the system is configured to supply any one or both of the condensed water recovered in the condensed water receiving section of the absorption tower and the condensed water separated in the separation drum as the cleaning water containing the $CO_2$ absorption liquid circulating within the system for the rough cleaning.

5. The $CO_2$ recovery system according to claim 1, wherein the filtration membrane device is configured to remove the solid contents collected by the filter by performing reverse washing using gas or a cleaning liquid supplied from the outside of the system.

6. The $CO_2$ recovery system according to claim 1, wherein at least two systems of the filters are provided in parallel in the lean solution branch line, the rich solution branch line or the both the solution branch lines, and alternately collect the solid contents in the branched solution.

7. The $CO_2$ recovery system according to claim 1, wherein the $CO_2$ absorption liquid is an amine-based absorption liquid.

8. A method for cleaning a filtration membrane device of a $CO_2$ recovery system, comprising:
bringing an exhaust gas containing $CO_2$ into contact with a $CO_2$ absorption liquid to remove $CO_2$ in an absorption tower;
regenerating a rich solution, which has absorbed $CO_2$, through heat exchange in an absorption liquid regeneration tower;
introducing the rich solution extracted from the absorption tower into the absorption liquid regeneration tower through a rich solution supply line;
extracting a lean solution from which $CO_2$ regenerated in the absorption liquid regeneration tower has been emitted from the absorption liquid regeneration tower to be introduced into the absorption tower through a lean solution supply line, and reusing the lean solution as the $CO_2$ absorption liquid in the absorption tower; and collecting solid contents remaining in a branched solution in a lean solution branch line, a rich solution branch line, or both the branch lines using a filter, and returning filtrate, which has passed through the filter, to the lean solution supply line, the rich solution supply line or both the solution supply lines, wherein, the filter is rough-cleaned by cleaning water containing the $CO_2$ absorption liquid circulating within the system; rough-cleaning water is returned to the lean solution supply line, the rich solution supply line or both the solution supply lines; the filter is finish-cleaned by cleaning water which does not include the $CO_2$ absorption liquid and which is from outside the system to wash out and remove the $CO_2$ absorption liquid which is adhered to the collected solid contents; finish-cleaning water which includes the $CO_2$ absorption liquid is returned to the lean solution supply line, the rich solution supply line or both the solution supply lines; a moisture content in the system is maintained at a prescribed value by adjusting a water balance in the absorption tower; and a concentration of the $CO_2$ absorption liquid which circulates within the system is kept at a prescribed concentration.

9. The method for cleaning the filtration membrane device of the $CO_2$ recovery system according to claim 8,
wherein any one or both of condensed water recovered in a condensed water receiving section of the absorption tower and condensed water separated in a separation drum are used as the cleaning water containing the $CO_2$ absorption liquid circulating within the system for the rough cleaning.

10. The method for cleaning the filtration membrane device of the $CO_2$ recovery system according to claim 8,
wherein the $CO_2$ absorption liquid is an amine-based absorption liquid.

11. The method for cleaning the filtration membrane device of the $CO_2$ recovery system according to claim 8,
wherein the water balance in the absorption tower is adjusted by controlling the temperature of cleaning water in a cleaning section.

12. The method for cleaning the filtration membrane device of the $CO_2$ recovery system according to claim 8,
wherein the water balance in the absorption tower is adjusted by controlling the temperature of cooling water in a cooling tower which cools the exhaust gas containing $CO_2$ before being introduced into the absorption tower.

13. The method for cleaning the filtration membrane device of the $CO_2$ recovery system according to claim 8,
wherein the solid contents collected by the filter are removed by performing reverse washing using gas or a cleaning liquid supplied from the outside of the system.

* * * * *